United States Patent Office 3,438,849
Patented Apr. 15, 1969

3,438,849
FUSIBLE CYCLOALIPHATIC ACETAL POLY-EPOXIDE-DICARBOXYLIC ACID REACTION PRODUCTS
Charles D. Isack, 553 Miller Ave., Clairton, Pa. 15025
No Drawing. Filed Aug. 31, 1966, Ser. No. 576,244
Int. Cl. B32b *17/10;* C08g *45/06*
U.S. Cl. 161—170     19 Claims

ABSTRACT OF THE DISCLOSURE

Cycloaliphatic acetal polyepoxides are reacted with dicarboxylic acids, with specified carboxyl/epoxide equivalent ratios, in the presence of specified amounts of catalysts to form fusible, polar solvent-soluble reaction products. The products can be cured to insoluble, infusible products with epoxide curing agents.

---

This invention relates to adducts or reaction products of cycloaliphatic acetal polyepoxides and dibasic organic acids. The adducts are film-forming, grindable solids which are heat stable, soluble in polar solvents and contain epoxy groups. They are particularly well adapted for applications including thermoset coatings, laminating, winding and molding compositions which have outstanding resistance to breakdown under high voltage and outdoor weathering.

It is well known that infusible epoxide compositions can be formed by reaction of epoxides and a variety of hardening agents, such as anhydrides. Such infusible compositions have found considerable application as resinous coatings, for example. Although some epoxide compositions have been employed as insulators for outdoor use under electric stress, they have not been wholly satisfactory. For example, they do not resist "tracking" sufficiently so as to be so used extensively. As a result of "tracking," surface resistivity is decreased and excessive current flow results. Thus, under such conditions, insulators break down. The compositions of this invention, however, are characterized by excellent track resistance. "Tracking" is the formation of a conductive path by an arc adjacent to the surface of a material.

It is an object of the present invention, therefore, to provide new fusible epoxide compositions, comprising adducts or reaction products of cycloaliphatic acetal polyepoxides and dibasic organic acids. Another object is to provide polymerizable compositions of the reaction products and epoxide curing agents. A further object is to provide insoluble, infusible compositions by mixing the reaction products with epoxide curing agents. Still another object is to provide cured, insoluble and infusible products. A further object is to provide a process for forming the fusible epoxide reaction products. Further objects will be apparent from the following description.

In accordance with the present invention, there is provided a fusible, polar solvent-soluble reaction product obtained by reaction of a dicarboxylic acid with a cycloaliphatic acetal polyepoxide having the general formula

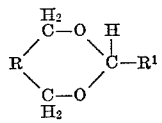

wherein R and R¹ each represent an organic radical containing at least one epoxide group, in the presence of a catalyst selected from the group consisting of (a) an organometallic compound
(b) an alkyl acid phosphate
(c) a tertiary amine
(d) a quaternary ammonium salt
(e) a phosphine the equivalent ratio of carboxyl to epoxide ranging from about 0.1/1 to about 0.4/1 with (a) and (b) and from about 0.2/1 to about 0.6/1 with (c), (d) and (e).

In accordance with the invention, there is also provided a polymerizable composition comprising the aforesaid reaction product and a curing amount of an epoxide curing agent. There are also provided cured, insoluble and infusible products.

A further embodiment of the invention is a process for forming the fusible reaction product. The process comprises heating a mixture of the acid, diepoxide and catalyst at a temperature between about 110° C. and 200° C. until a resinous product, which is soluble and has a melting point about 65° C., has formed. The catalyst and equivalent ratios are those defined above.

ALICYCLIC ACETAL POLYEPOXIDES

The polyepoxides of this invention are characterized by an acetal grouping and are represented by the following formula

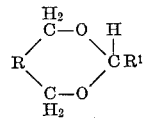

wherein R and R¹ each represent an organic radical containing at least one epoxide group. Such epoxides and methods for the preparation thereof are known in the art, as evidenced by U.S. Patents Nos. 3,076,278; 3,147,-279 and 3,210,375. Preferred herein are diepoxides and particularly 3, (3,4 epoxy-cyclohexyl 1)-8,9 epoxy-2,4 dioxaspiro[5.5]undecane. This diepoxide is referred to hereinafter as diepoxide A. This has the formula

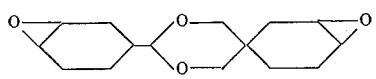

Another illustrative alicyclic acetal diepoxide is 2,(8',9' epoxy-2',4' dioxaspiro[5'.5']undecycl-3') ethyl 3,4 epoxycyclohexyl ether, represented by:

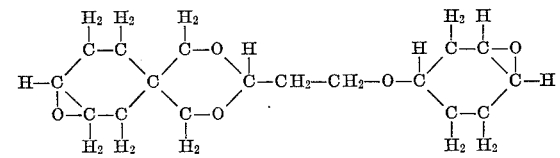

This diepoxide is referred to below as diepoxide B.

DICARBOXYLIC ACIDS

As indicated above, dicarboxylic acids are reacted with the said polyepoxides. The acids can be: saturated or unsaturated; aliphatic, cycloaliphatic or aromatic; unsubstituted or substituted with such groups as hydroxyl, halogen, ether and ester. Examples of such dibasic acids include: adipic; pimelic, suberic, azelaic, sebacic, undecandioic, dodecandioic, dimer acids as those formed from unsaturated $C_{18}$-acids, products of reaction of two molar proportions of dibasic acids or anhydrides with glycols such as ethylene glycol, di- or tri- or poly-ethylene glycols, propylene glycol, di- or tri- or poly-propylene glycols, 1,4-butanediol and neopentyl-glycol.

Dicarboxylic acids unsuitable for reaction with the polyepoxides are those unsubsitituted acids having acid groups attached to adjacent carbon atoms, as illustrated by succinic, maleic, citraconic, pthalic and hexahydrophthalic acids. Dicarboxylic acids having shorter carbon chains than adipic are to be avoided when catalysts of groups (a) and (b) are employed.

CATALYSTS

In order to avoid the formation of infusible products when reacting the polyepoxides and the dicarboxylic acids, certain catalysts are employed. The catalysts are those which fall into several classifications.

Organometallic catalysts are those which include: salts such as stannous, zinc, manganese, iron and cobalt octoates, stearates, naphthenates, neopentanoates; titanate esters and chelates; and vanadyl chelates.

Alkyl acid phosphate catalysts include: methyl, ethyl, butyl, amyl and lauryl acid phosphates.

The fusible reaction products formed in the presence of the organometallic catalysts or alkyl acid phosphate catalysts show little or no change in color during the reaction; are insoluble in xylene; or partially soluble in methyl isobutyl ketone (MIBK); are completely soluble in a 1/1/1 solvent blend of MIBK/xylene/Cellosolve (2-ethoxyethanol); and have melting points above 65° C.

Tertiary amine catalysts include mono- and polyamines and are illustrated by: triethylamine, tributylamine, triphenylamine, tricyclohexylamine, methyl diethanol amine, diethylaminoethanol, benzyl dimethylamine, alpha-methylbenzyl dimethylamine, triethylene diamine, pyridine and quinoline.

Quaternary ammonium salt catalysts are represented by the general formula

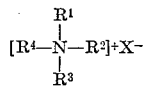

wherein $R^1$ through $R^4$ are the same or different hydrocarbon radicals and X is an ion of an inorganic acid. Typical of such salts are benzyltrimethylammonium chloride, benzyltrimethylammonium sulfate, benzyltrimethylammonium nitrate, benzyltrimethylammonium bromide, and cyclohexyltrimethylammonium chloride.

Organic phosphines suitable herein are those having the general formula

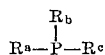

wherein at least one of $R^a$ through $R^c$ is an organic radical and the others are hydrogen or the same or different organic radicals. Representative phosphines include triphenyl phosphine, tricyclohexyl phosphine, tributyl phosphine, and cyclohexyl octyl phosphine.

The fusible reaction products obtained by using catalysts of clases (c) through (e): darken in color during the reaction; are partially soluble in xylene; are completely soluble in MIBK; and have melting points above 65° C. A further characterizing difference between the use of catalysts of classes (a) and (b) and those of classes (c)–(e), is in the equivalent ratio of dibasic acid required. Compared with catalysts of (a) and (b) classes, higher equivalent ratios of carboxyl to epoxide are required with each acid in order to obtain a product with a melting point above 65° C.

While the catalysts identified above can be used in amounts ranging from about 0.005 to about 10 percent by weight of the total amount of polyepoxide and dicarboxylic acid, preferred amounts are of the approximate range 0.05–5 percent.

ACID-EPOXIDE PROPORTIONS

When the catalysts employed are organometallic or alkyl acid phosphate compounds, the equivalent ratio of carboxyl group to epoxide group is of the approximate range 0.1/1 to 0.4/1, depending on the reactivity of the acid. Correspondingly, when one or more of the other catalysts are used, the ratio is of the order of 0.2/1 to 0.6/1, depending on the reactivity of the acid.

"Equivalent ratio," as used herein, is expressed as the relative amount of carboxyl group of the dicarboxylic acid reactant per epoxy group of the polyepoxide reactant.

PROCESS

It has been discovered that the desired fusible reaction products are formed under critical conditions. Thus, one or more of the acetal polyepoxides and one or more of the dicarboxylic acids are mixed thoroughly to affect a solution and the catalyst is added with stirring. If it is necessary to use heat to dissolve the acid in the diepoxide, preferred practice is to cool this solution to about 50° C. or less before adding the catalyst. The resulting mixture is then heated to a temperature of 120–165° C., preferably for a period of 2 to 16 hours. The heated mixture is then cooled to room temperature (20–25° C.). The cooled product is a clear, brittle solid.

In contrast, when the catalyst is omitted, an insoluble, infusible product is formed in less than 4 hours at 150° C. Correspondingly insoluble, infusible resins are formed when an anhydride or a tribasic acid is substituted for the dicarboxylic acid and a catalyst of (a)–(e) is employed. This same result occurs even when the carboxyl/epoxide equivalent ratio is reduced to 0.15/1 with an anhydride reactant.

A further contrast is found in the substitution of a monobasic acid for part of the dicarboxylic acid; in such case, a tacky product is obtained.

A solvent or diluent may be employed in forming the desired fusible reaction products. Suitable solvents or diluents include: methyl isobutyl ketone, methyl isoamyl ketone, methyl-n-amyl ketone, methyl Cellosolve acetate, Cellosolve acetate, amyl acetate, butyl acetate and mixtures thereof.

The invention is illustrated further by the following typical examples. All parts are by weight unless indicated otherwise.

Example 1

(A) One hundred parts of diepoxide A and 17 parts of azelaic acid were heated and stirred together until the acid dissolved at approximately 110° C. The carboxyl to epoxide equivalent ratio is 0.3/1. The heated mixture was cooled to 50° C. and 4 parts of a zinc neopentanoate catalyst containing 16 percent (weight) of zinc, were added thereto while the mixture was stirred. The resulting mixture was poured into a shallow pan and was heated in an oven for 4 to 16 hours at 120–150° C. The pan was removed from the oven and was cooled to room temperature. The product is a clear, brittle, fusible solid which is soluble in a 1/1/1 mixture of MIBK/xylene/Cellosolve and has a melting point above 65° C.

(B) By way of comparison, when the catalyst is omitted in this example, an insoluble, infusible, clear solid is formed.

(C) A further comparison is provided by using 100 parts of diepoxide A and 25 parts of dodecenyl succinic anhydride; the equivalent ratio is 1/0.15. Diepoxide A and the anhydride were heated together with 4 parts of the zinc neopentanoate catalyst at 150° C. for 12 hours. The resulting product was cooled to room temperature (20–25° C.) and was found to be very strong and tough. It was not soluble in a 1/1/1 mixture of MIBK/xylene/Cellosolve.

(D) Another comparison is shown by use of 100 parts of diepoxide A, 52 parts of a trimer acid, and 4 parts of the zinc catalyst, under the conditions given in C above. The equivalent ratio was 1/0.3. The product so obtained is only slightly soluble in the 1/1/1 solvent mixture.

(E) Still another comparison reveals that a monocarboxylic acid is undesirable. One hundred parts of diepoxide A were used with 52 parts of a proprietary $C_{18}$- acid mixture, and 4 parts of the zinc catalyst. The acid mixture contains 35 percent of monomer acid and 65% of dimer acid. The reactants and catalyst were heated as described above at 150° C. for 20 hours. The product was a soft, tacky, semisolid.

Example 2

Dodecandioic acid (22 parts) was dissolved in 100 parts of diepoxide A by heating the same at 125° C. in a jacketed reactor fitted with a stirrer. The acid was completely dissolved, whereupon the mixture was cooled to 45–50° C., and 2 parts of zinc stearate were added, with stirring continued. The catalyst was dispersed in the mixture. The resulting product was transferred to shallow pans. The pans were placed in an oven maintained at 150° C., and so heated for 4–6 hours. The product was cooled to room temperature and was then removed from the pans. It is a light colored solid with a melting point above 65° C., and is soluble in a 1/1/1 solvent mixture of MIBK/xylene/Cellosolve.

Example 3

Following the procedure of Example 2, 100 parts of diepoxide A and 52 parts of dimer acid (molecular weight of 565) were first heated at 40° C. The catalyst employed was stannous octoate, 0.8 part. The product is a pale yellow solid having a softening point above 65° C., and is soluble in a 1/1/1 mixture of MIGK/xylene/Cellosolve.

Example 4

Following the procedure of Example 2, 100 parts of diepoxide A and 13 parts of adipic acid were first heated at 140° C. Cooling was carried to 50–55° C. Two parts of benzyl dimethyl amine were used as catalyst. The oven heating period was 8–12 hours. The product is a tan solid having a softening point above 65° C. and is completely soluble in MIBK.

Example 5

The procedure of Example 2 was followed. Twenty parts of azelaic acid were dissolved in 100 parts of diepoxide A by heating the same to 110° C. The solution was cooled to 50° C. and 2 parts of benzyltrimethyl ammonium chloride were added with stirring. The catalyst comprised 60% solids in aqueous solution. The resulting mixture was poured into shallow pans and was heated for 16–20 hours at 150° C. When cooled to room temperature (20–25° C.), the product is a clear, tan-to-brown solid which has a softening point above 60° C. and is completely soluble in MIBK.

Example 6

Twelve parts of azelaic acid and 100 parts of diepoxide A were heated to 110° C. The solution was cooled to 40° C. and 0.5 part of n-butyl acid phosphate was added with stirring. The catalyst is a commercial product containing approximately equimolar quantities of mono- and di-butyl acid phosphates. The resulting mixture was transferred to shallow pans. The pans were heated for 2 hours at 150° C. When cooled to room temperature, the resulting product is a clear, pale yellow solid which has a melting point above 65° C. and is completely soluble in a 1/1/1 mixture of MIBK/xylene/Cellosolve.

Example 7

This was the same as Example 4 except for the use of 2 parts of triphenyl phosphine as the catalyst. The product is a clear, tan-to-brown solid with a melting point above 65° C. It is completely soluble in MIBK.

Example 8

Twenty-four parts of azelaic acid were dissolved in 100 parts of diepoxide B by heating the same at 110° C. The resulting solution was cooled to 50° C. and 2 parts of benzyldimethylamine were added thereto. The mixture which was formed was transferred to shallow pans. The pans were heated in an oven at 150° C. for 6 hours. When cooled, the resulting product was a clear, friable solid having a melting point above 65° C. It was soluble in MIBK.

Any and all of the reaction products prepared as described above can be used individually or in combinations in a variety of applications. For simplicity, a representative number of illustrations are given below. Here too, all parts are by weight unless indicated otherwise.

Example 9

An infusible composition is formed from fusible reaction product of Example 1, in the following manner. The quantities used are:

| | |
|---|---|
| Fusible product, Example 1 | 121 |
| Azelaic acid | 29 |
| Aliphatic hydrocarbon resin, M.P. 100° C. | 20 |
| Mixed solvent, 1/1/1 Cellosolve/MIBK/xylene | 130 |
| Calcium silicate | 350 |
| Iron oxide pigment (brown) | 10 |
| Zinc neopentanoate drier | 3 |

The total carboxyl/epoxy equivalent ratio is 0.8/1. The fusible product, azelaic acid and hydrocarbon resin, were stirred in the mixed solvent until completely dissolved. Approximately 75 percent of the resulting solution was mixed with the silicate and pigment. The mixture so formed was passed over a 3-roll mill to form a paste dispersion. The balance of the solution was added to the paste dispersion to form a free flowing coating composition. The drier was added, with stirring, to form a finished coating composition. This composition has a shelf life of at least 5 months at room temperature. It is applied by brush or spray to a steel panel or thermoset laminate. The resulting coating is dried for 10 minutes at 120° C. Second and third costs are applied and dried in the same manner. The dried film is cured at 165° C. for 2–4 hours. The cured film so obtained is hard and glossy and has excellent adhesion. It has a grade 8 track resistance.

Example 10

A room temperature cure coating is formed from the reaction product of Example 4 in the following manner. The coating comprises:

Component A:

| | |
|---|---|
| Reaction product, Example 4 | 100 |
| Methyl ethyl ketone (MEK) | 150 |

Component B:

| | |
|---|---|
| Reaction product of 1 mole of pyromellitic dianhydride and 0.5 mole of polypropylene glycol (Molecular weight, 1000) | 125 |
| MEK | 125 |

Equal parts of Components A and B were mixed together. Additional solvent, MEK, is added if necessary to permit spraying of the mixture. The mixture has a working life of about 2 days. The mixture was sprayed on a steel panel. It dries in 4 hours and is completely cured in 7 days at room temperature, or 30 minutes at 95° C. There was no chalking of the dried film after 500 hours in the Atlas Weatherometer. The film is extremely flexible and is track-resistant.

The Weatherometer is a device which exposes a sample under test to ultraviolet light, moisture and heat in successive, reproducible cycles to stimulate outdoor weathering.

Example 11

A composition suitable for use as a laminating or filament winding adhesive is formed from the reaction product of Example 5, in the following manner.

The composition is formed of:

| | |
|---|---|
| Reaction product, Example 5 | 100 |
| MIBK | 150 |
| 2-ethyl-4-methyl imidazole | 2 |

The reaction product was dissolved in MIBK, and the imidazole (an amine curing agent) was added just before the resulting composition was used. The composition is useable for 2–3 days. Glass cloth, mat, fibre or other web is passed through this composition. After drying to remove solvent (MIBK), the impregnated web can be laminated in a suitable press at 125–200° C. and 50–200 pounds per square inch (p.s.i.) pressure. Fibers impregnated with this composition can be used for filament winding and cured at 150–170° C. for 1–8 hours. The resulting laminates are track resistant.

Example 12

Illustrated in this example is the preparation of a fluidized bed coating from the reaction product formed in Example 2. The coating is comprised of:

| | |
|---|---|
| Reaction product, Example 2 | 100 |
| Azelaic acid | 24 |
| Diallylmelamine | 1 |
| Aliphatic hydrocarbon resin (M.P. 100° C.) | 10–50 |
| Cab-O-Sil (a silica aerogel) | 5–6 |
| Red iron oxide | 5 |

The aliphatic hydrocarbon resin is Piccopale 100, which is comprised of polymerized dienes and reactive olefins from petroleum. No aromatic structures are present. The resin has excellent stability to ultraviolet light and moisture.

The reaction product, azelaic acid and hydrocarbon resin were pulverized to 60 mesh. The pulverized mixture and all other components were placed in a ball mill jar and were ball milled for 8 hours, whereupon a free flowing powder was obtained. This powder is placed in a tank which is divided into two sections by a porous plate. Air or gas under pressure from the lower section passes through the porous plate, which suspends the dry powdered epoxy composition in the upper section of the tank. The parts to be coated are preheated to 150–180° C. and are then immersed in a fluidized powder for 1–5 seconds. The powder fuses and adheres to the part. Final cure requires one hour at 180° C. to obtain a smooth, hard coating which is resistant to tracking and to outdoor weathering.

Example 13

An epoxy molding composition is formed from the reaction product described in Example 2, from the following components:

| | |
|---|---|
| Reaction product, Example 2 | 100 |
| Phthalic anhydride | 15–25 |
| Zinc stearate, powder | 5–7.5 |
| Terpene phenolic resin, M.P. 135° C. | 10–50 |
| Silica, 325 mesh | 100–225 |
| Cadmium red pigment | 10 |

The reaction product, phthalic anhydride and terpene phenolic resin were crushed to 40 mesh. The resulting mixture and all other components were ball milled for 4–6 hours. The resulting powder was compacted and then reground to 14–20 mesh. The desired molding compound was cured and formed in a transfer or compression molding machine at 180° C.

In Examples 9–13, a variety of curing agents, fillers, pigments and other components are given by way of illustration.

The epoxide compositions produced from cycloaliphatic acetal diepoxides and dicarboxylic acids as described above can be converted into insoluble, infusible plastics by further reaction with curing agents and catalysts which are well known in the art. Included among such compounds are polyfunctional amines such as diethylene triamine, triethylene tetramine, diethyl amino propylamine, iminobis propylamine, tetramethylene diamine, hexamethylene diamine, dodecyl polyamine, aminoethyl piperazine, menthane diamine, 2-ethyl, 4-methyl imidazole, ethylene adduct of diethylene triamine, propylene adduct of diethylene triamine, cyanoethyla- tion adduct of diethylene triamine, dicyanamide, melamine, diallyl-melamine, diamino pyridine, diaminodimethyl sulfone, metaphenylene diamine, 4,4'-methylenedianiline, and polyamides such as those from the reaction of linoleic acid dimer and ethylene diamine; acid and acid anhydride curing agents such as adipic, succinic, dodecenyl succinic, azelaic, sebacic acids, dimer and trimer acids from $C_{18}$-unsaturated acids, acid terminated polyesters from dibasic acids or acid anhydride and glycols, phthalic, tetrahydrophthalic, hexahydrophthalic, methyl tetrahydrophthalic, methylbicyclo(2.2.1)heptene-2,3-dicarboxylic, chlorendic, trimellitic anhydrides and pyromellitic dianhydride; and catalysts including triethylamine, benzyl, dimethylamine, triethanolamine, boron, trifluoride etherate, boron trifluoride monoethylamine, triethylanolamine borate, phosphoric acid, dicyanamide, adipyl hydrazide, titanate esters and chelates.

Curing amounts of curing agent are employed. Generally, from about 0.1 to about 200 per cent by weight, and preferably from 1 to 100 percent, based upon the polyepoxide are employed.

Suitable fillers include: silica, talc, wollastonite, alumina, lithium aluminum silicate, aluminum silicate, hydrated alumina, glass microspheres, gypsum, zirconia, feldspar, nepheline syenite, mica, asbestos, walnut shell flour, calcium carbonate, polyethylene and polypropylene powders, glass flake, glass fibers, and synthetic fibers such as Dacron, nylon and orlon.

Compatible resin modifiers can also be included. Typical are: bisphenol A epoxides; low molecular weight polystyrenes; highly substituted phenolic resins and aliphatic hydrocarbon resins; asphaltic and coal tar resins; polybutenes; chlorinated polyphenyls; coumarone-indene resins; alkyds and acrylics.

Suitable pigments include: iron oxides, chrome green, ultramarine blue, chrome yellow, molybdate orange, cadmium blue, cadmium reds, selenium reds, titanium dioxide, carbon black, phthalocyanine blues and greens.

Tracking values referred to above are determined in accordance with the "Differential Wet Track Test" described in Westinghouse Technical Bulletin 99–351, December 1962. This test provides an evaluation of the relative ability of an insulating material to withstand conditions similar to atmospheric condensed moisture and dirt. Susceptibility to failure by surface as well as internal tracking, can be distinguished. While many compositions to date have been characterized by grades 5–7 in this test, few if any have been of grade 8. To meet the standards of grade 8, there must be no tracking or erosion in 60 seconds of a composition subjected to a power level discharge of 8.1 watts. As indicated above, the composition of Example 9 has a grade 8 value. The compositions of Examples 10–13 have grade 7 or 8 values depending upon the fillers and modifiers present therein.

The invention is illustrated by the foregoing description and examples. It is not to be construed as limited thereto, but is to be construed in keeping with the language of the appended claims.

I claim:

1. A fusible, polar solvent-soluble reaction product obtained by reaction of a dicarboxylic acid free from acid groups attached to adjacent carbon atoms thereof, with a cycloaliphatic acetal polyepoxide having the general formula

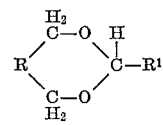

wherein R and $R^1$ each represent an organic radical containing at least one epoxide group, in the presence of a catalyst selected from the group consisting of (a) a metal-containing compound selected from the group consisting of a carboxylate of a metal selected from the group consisting of tin, zinc, manganese, iron and cobalt, a titanium chelate, a vanadium chelate and a titanium ester,
(b) an alkyl acid phosphate,
(c) a tertiary amine,
(d) a quaternary ammonium salt, and
(e) a phosphine,
the equivalent ratio of carboxyl to epoxide ranging from about 0.1/1 to about 0.4/1 with (a) and (b) and from about 0.2/1 about 0.6/1 with (c), (d) and (e).

2. A reaction product of claim 1 wherein the polyepoxide is a diepoxide.

3. A reaction product of claim 1 wherein the polyepoxide is

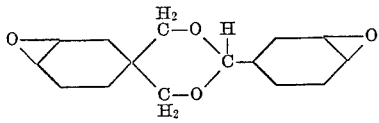

4. A reaction product of claim 1 wherein the acid is azelaic acid.

5. A polymerizable composition comprising a reaction product of claim 1 and a curing amount of an epoxide curing agent.

6. A cured, insoluble and infusible product obtained from the composition defined in claim 5 and a curing agent.

7. An insoluble, infusible product obtained by mixing the reaction product of claim 1 with an epoxide curing agent.

8. The process for preparing a fusible, polar solvent-soluble reaction product of a dicarboxylic acid free from acid groups attached to adjacent carbon atoms thereof, and a cycloaliphatic acetal diepoxide having the formula

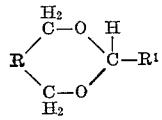

which comprises heating a mixture of the acid, diepoxide, and catalyst at a temperature between about 110° C. and about 200° C., until a fusible, polar solvent-soluble, resinous product having a melting point above about 65° C. is formed; the catalyst and quantity thereof being as defined in claim 1.

9. A process defined by claim 8 wherein the dicarboxylic acid and the diepoxide are heated to an elevated temperature to form a solution, the solution is cooled to a temperature below about 50° C., the catalyst is added, and the resulting mixture is heated to a temperature between about 120° C. and about 165° C. until a fusible resinous product having a melting point above about 65° C. is formed.

10. A composition comprising a reaction product of claim 1 and an aliphatic hydrocarbon resin.

11. A coating composition curable at room temperature comprising a reaction product of claim 1 and a reaction product of a polycarboxylic acid anhydride and of a polyalkylene glycol.

12. A laminated article comprising a plurality of glass fibers and as a binder therefor, a reaction product of claim 1 cured with an epoxide curing agent.

13. A fluidized bed coating comprising a reaction product of claim 1, a dicarboxylic acid and an aliphatic hydrocarbon resin.

14. A molding composition comprising a reaction product of claim 1, a dicarboxylic acid anhydride and a phenolic resin.

15. A composition comprising a reaction product of claim 1 and a terpene phenolic resin.

16. A composition comprising a reaction product of claim 1 and a polybutene.

17. A composition comprising a reaction product of claim 1 and a bisphenol A epoxide.

18. A reaction product of claim 1 wherein the quantity of catalyst is from about 0.005 to about 10 percent by weight of the total amount of polyepoxide and dicarboxylic acid.

19. A reaction product of claim 1 wherein the catalyst is zinc neopentanoate.

References Cited

UNITED STATES PATENTS 3,211,750 10/1965 Batzer et al. _____ 260—340.7
3,318,822 5/1967 Batzer et al. _____ 260—2

JOSEPH L. SCHOFER, *Primary Examiner.*
C. A. HENDERSON, JR., *Assistant Examiner.*

U.S. Cl. X.R.

117—21; 161—185; 260—47, 75, 78.4, 830, 831, 835, 836

U.S. DEPARTMENT OF COMMERCE

PATENT OFFICE

Washington, D.C. 20231

UNITED STATES PATENT OFFICE
CERTIFICATE OF CORRECTION

Patent No. 3,438,849

April 15, 196'

Charles D. Isack

It is certified that error appears in the above identified patent and that said Letters Patent are hereby corrected as shown below:

Column 2, line 17, before "200°" insert -- about --; line 19, "about" should read -- above --; line 35, "3,076,278" should read -- 3,072,678 --; line 37, cancel "1"; line 52, "$H_2$", first occurrence, should read -- H --. Column 3, line 1, "pthalic" should read -- phthalic --; line 53, "clases" should read -- classes --. Column 5, line 28, "MIGK" should read -- MIBK --. Column 6, line 37, "costs" should read -- coats --. Column 8, line 14, "boron," should read -- boron --; line 16, "triethylanolamine" should read -- triethanolamine --.

Signed and sealed this 14th day of April 1970.

(SEAL)
Attest:

Edward M. Fletcher, Jr.
Attesting Officer

WILLIAM E. SCHUYLER, JR.
Commissioner of Patents